June 10, 1924.
F. P. PRAWALSKI
1,497,380
MILK PAIL
Filed Sept. 19, 1922
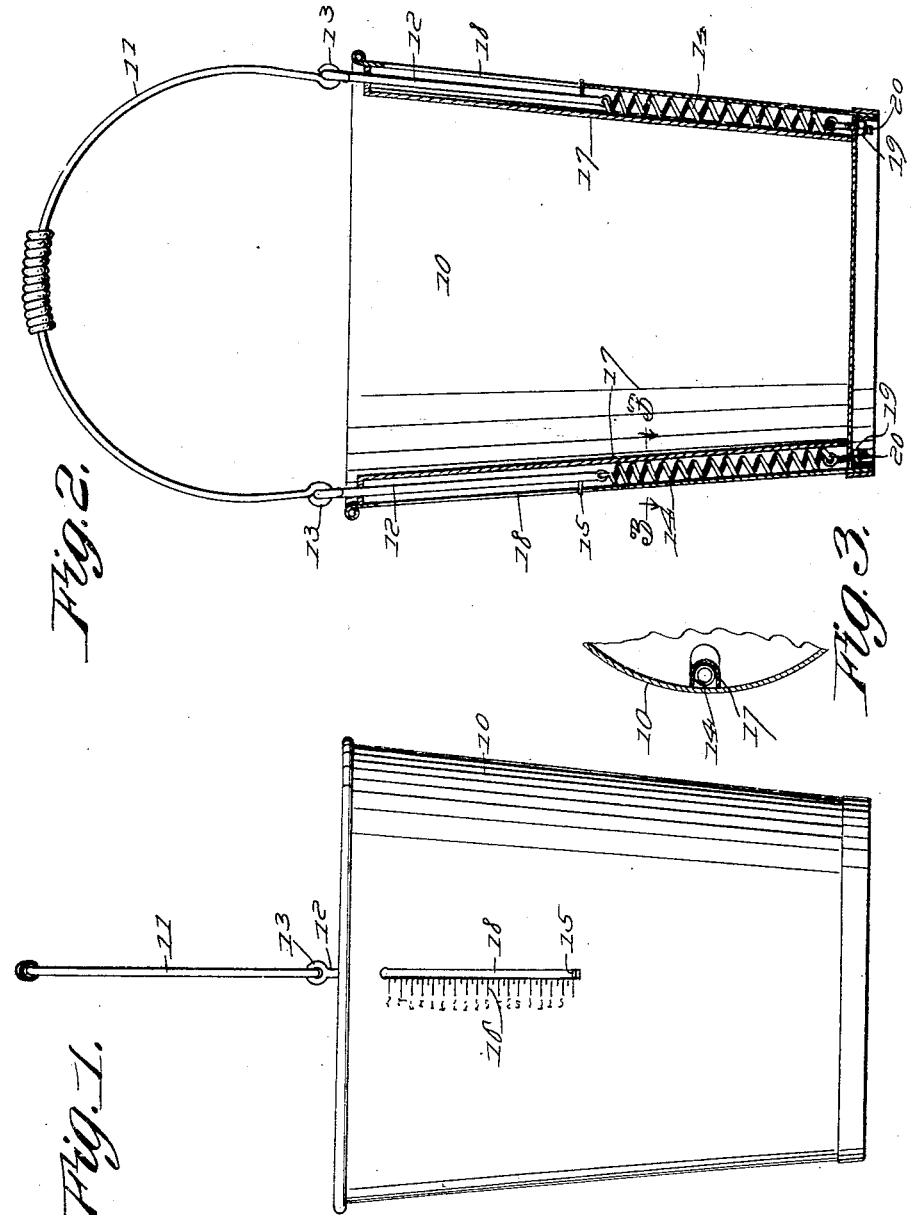

Patented June 10, 1924.

1,497,380

UNITED STATES PATENT OFFICE.

FREDRICK P. PRAWALSKI, OF SWANVILLE, MINNESOTA, ASSIGNOR OF ONE-HALF TO PETER P. TYVOLL, OF SWANVILLE, MINNESOTA.

MILK PAIL.

Application filed September 19, 1922. Serial No. 589,223.

*To all whom it may concern:*

Be it known that FREDRICK P. PRAWALSKI, a citizen of the United States of America, residing at Swanville, in the State of Minnesota, has invented new and useful Improvements in Milk Pails, of which the following is a specification.

The object of the invention is to provide a milk pail of the type which may conveniently be used by the milker and which, therefore, is of the downwardly reduced or tapered form suitable to be supported between the knees, whereby the quantity of milk furnished by each cow may be determined by weight as a means of keeping an accurate record of the supply without necessitating the handling of the milk or the separate or independent measuring or weighing thereof subsequent to the milking operation and prior to deposit in the shipping or delivery cans; and with this object in view the invention consists in a construction and combination of parts of which a preferred embodiment is shown in the accompanying drawings, wherein:—

Figure 1 is a side view,

Figure 2 is a vertical sectional view of a milk pail constructed in accordance with the invention, and Figure 3 is a detail sectional view on the line indicated by line 3—3 of Figure 2.

The pail 10 is preferably of a downwardly tapered or reduced type which is most conveniently used by milkers in that it may readily be held during the operation between the knees of the operator and which as in the ordinary practice is provided with the carrying bail 11, and the connection between the bail terminals and the body portion of the pail consist of spring-balanced scales including rods 12 provided at their upper ends with eyes 13 for engagement by the terminal eyes of the bail, balance springs 14, and an indicator 15 traversing a scale 16 on the exterior surface of the pail. In the construction illustrated and for the purpose of presenting a practically unobstructed exterior surface for the pail, so as not to interfere with its performance of the usual functions of a milking pail, the guide tubes 17 in which the rods and springs are mounted and housed are disposed at the inner surface of the wall of the pail, and the latter is provided with slots 18 through which the indicators project for movement with relation to the scales, which if desired may be differently graduated for different materials or materials of different specific values as for example new milk and cream, so that either may be measured by weight.

The accurate tensioning or adjustment of the balance springs may be effected by means accessible from the exterior of the pail as for example the nuts 19 engaging adjusting stems 20 connected with the lower ends of the springs.

With an apparatus such as described it is obvious that the milk delivery by each cow may be weighed immediately upon the lifting of the bucket by means of the bail after the completion of the milking operation and as the milk is being deposited in the shipping can or other receptacle provided for the purpose without going through a separate operation of measuring or weighing as in the ordinary practice; and in this way the time of the operator is saved while an accurate record may be kept of the production of the several animals in the herd and the amount of milk deposited in each receptacle.

Having described the invention, what is claimed as new and useful is:—

1. A milk pail provided with slots in its wall and with graduated scales adjacent the edges of said slots, guides mounted on the interior surface of the wall of the pail, a supporting bail, rods fitted in the guides and provided with indicators extending through said slots and traversing the scales, the bail being connected with said rods, and balance springs connected with said rods and housed within said guides.

2. A milk pail provided with slots in its wall and with graduated scales adjacent the edges of said slots, guides mounted on the interior surface of the wall of the pail, a supporting bail, rods fitted in the guides and provided with indicators extending through said slots and traversing the scales, the bail being connected with said rods, balance springs connected with said rods and housed within said guides, and means for adjusting the tension of said springs and consisting of stems connected with the terminals of the springs and nuts engaged with the stems and arranged exteriorly of the bottom of the pail, said stems extending slidably through said bottom below said guides.

In testimony whereof he affixes his signature.

FREDRICK P. PRAWALSKI.